United States Patent [19]

Baird et al.

[11] Patent Number: 4,846,359
[45] Date of Patent: Jul. 11, 1989

[54] MULTI-LAYERED PLASTIC BOTTLE HAVING INTEGRALLY FORMED HANDLE AND METHOD OF MAKING

[75] Inventors: James C. Baird; Cornelis H. Japikse; Steven F. Quigley; Edward J. Simpson, all of Cincinnati, Ohio

[73] Assignee: The Procter & Gamble Company, Cincinnati, Ohio

[21] Appl. No.: 134,643

[22] Filed: Dec. 18, 1987

[51] Int. Cl.⁴ .................. B65D 23/02; B65D 23/08; B65D 23/10

[52] U.S. Cl. .................. 215/12.2; 215/1 C; 215/100 A; 220/94 A

[58] Field of Search .................. 215/1 C, 12.1, 12.2, 215/100 A; 428/35, 549, 483; 264/514, 515; 206/524.2; 220/94.A

[56] References Cited

U.S. PATENT DOCUMENTS

| | | | |
|---|---|---|---|
| 2,781,551 | 2/1957 | Richerod | 18/55 |
| 3,023,461 | 3/1962 | Sherman | 264/515 |
| 3,082,484 | 3/1963 | Sherman | 18/55 |
| 3,113,831 | 12/1963 | Coale | 264/512 |
| 3,120,679 | 2/1964 | Price et al. | 215/1 C |
| 3,140,004 | 7/1964 | Schaich | 215/1 C |
| 3,322,869 | 5/1967 | Scott, Jr. | 264/515 |
| 3,457,337 | 7/1969 | Turner | 264/515 |
| 3,547,294 | 12/1970 | Williams | 215/1 |
| 3,804,663 | 4/1974 | Clark | 117/101 |
| 3,882,259 | 5/1975 | Nohara et al. | 428/35 |
| 3,898,310 | 8/1975 | Schiemann | 264/512 |
| 3,925,591 | 12/1975 | Brettenfellner et al. | 428/483 |
| 3,940,001 | 2/1976 | Haefner et al. | 215/1 C |
| 3,955,697 | 5/1976 | Valyi | 215/1 C |
| 4,079,850 | 3/1978 | Suzuki et al. | 215/1 C |
| 4,092,391 | 5/1978 | Valyi | 264/97 |
| 4,109,813 | 8/1978 | Valyi | 215/1 C |
| 4,149,645 | 4/1979 | Valyi | 215/1 C |
| 4,256,231 | 3/1981 | Cioc et al. | 215/1 C |
| 4,327,052 | 4/1982 | Sauer | 264/512 |
| 4,372,455 | 2/1983 | Cochran | 215/100 A |
| 4,393,106 | 7/1983 | Maruhashi et al. | 428/35 |
| 4,501,781 | 2/1985 | Kushida et al. | 428/35 |
| 4,522,775 | 6/1985 | Briggs et al. | 264/514 X |
| 4,528,219 | 7/1985 | Yamada et al. | 428/483 X |
| 4,535,901 | 8/1985 | Okudaira et al. | 215/1 C |
| 4,552,396 | 11/1985 | Rais | 294/27.1 |
| 4,568,261 | 2/1986 | McHenry et al. | 425/145 |
| 4,649,004 | 3/1987 | Nohara et al. | 264/514 X |
| 4,656,094 | 4/1987 | Kojima et al. | 428/483 |
| 4,705,708 | 11/1987 | Briggs et al. | 428/35 |
| 4,720,425 | 1/1988 | Hattori et al. | 428/483 X |

*Primary Examiner*—Sue A. Weaver
*Attorney, Agent, or Firm*—John J. Ryberg; E. Kelly Linman; John V. Gorman

[57] ABSTRACT

A multi-layered, handled plastic bottle that substantially resists the absorption and oxidation of essential oils, flavoring components, and nutritional components, e.g. peel oil, d-limonene, and l-ascorbic acid (Vitamin C), found in various beverages such as fruit juices and particularly citrus juices. In a particularly preferred embodiment, the plastic bottle having an integrally-formed handle is made by blow-molding an extruded parison having an outer polyolefin layer, and intermediate adhesive layer, and an inner product-contacting layer of a polyester material such as polyethylene terephthalate. In another particularly preferred embodiment, the plastic bottle is extrusion blow-molded from a four-layer parison comprised of an outer polyolefin layer, an intermediate adhesive layer, an inner polyester layer, and a scrap or regrind layer comprised of a blend of these three layers recovered from the flash removed from the finished bottle. Also disclosed is a method of and an apparatus for making multi-layered, handled plastic bottles of the present invention.

8 Claims, 3 Drawing Sheets

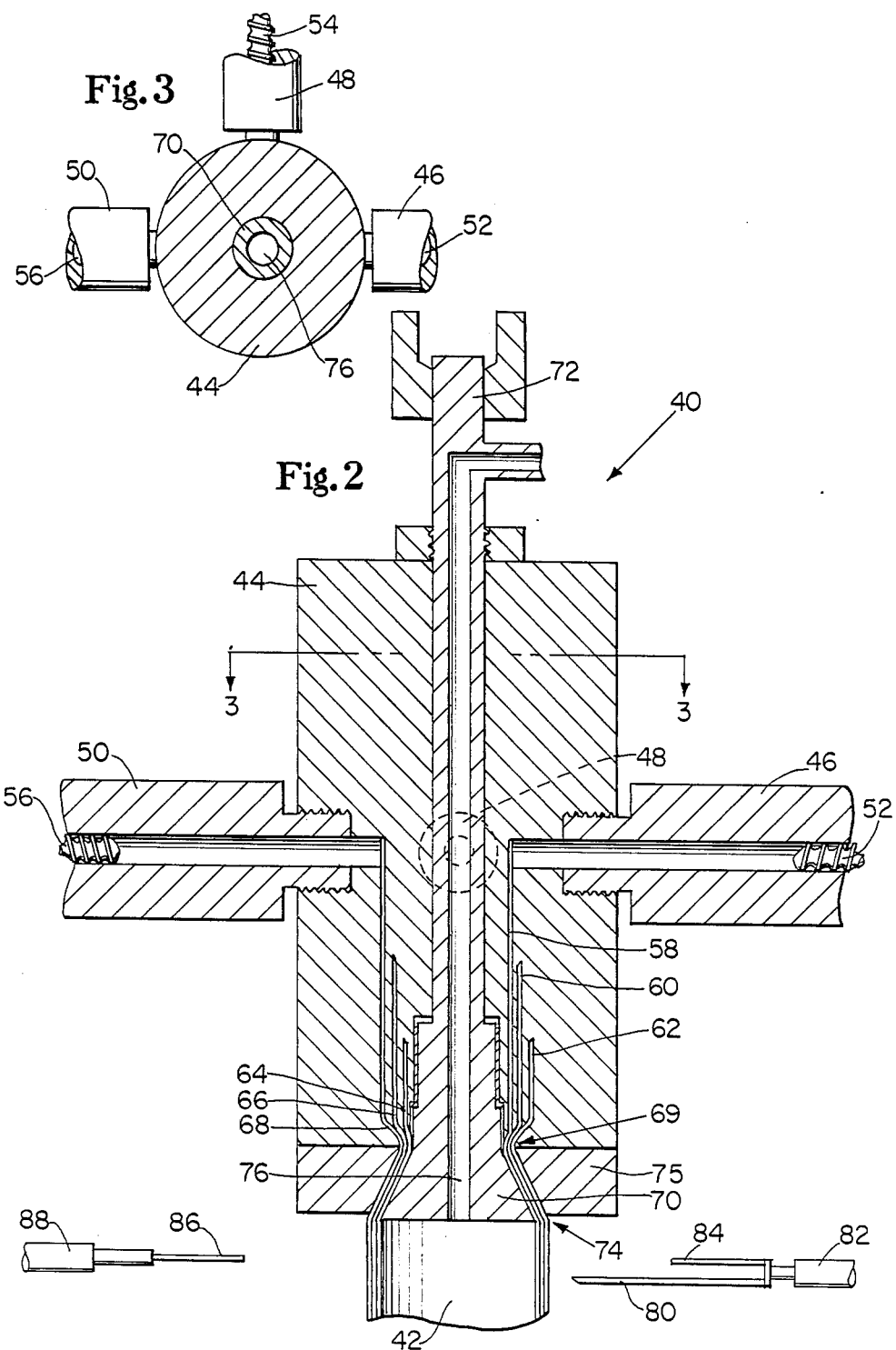

MULTI-LAYERED PLASTIC BOTTLE HAVING INTEGRALLY FORMED HANDLE AND METHOD OF MAKING

TECHNICAL FIELD

The present invention relates to multi-layered plastic bottles and methods of making such bottles. More particularly, the present invention relates to a multi-layered, handled plastic bottle having an inner product-contacting surface that does not readily absorb essential oils and flavor components found in a liquid contained therein.

BACKGROUND OF THE INVENTION

Plastic containers and bottles have been used for many years to package a wide variety of products such as milk, soft drinks, pasty foods, cosmetics, detergents, and the like. Since polyolefins such as polyethylene and polypropylene are relatively inexpensive, widely available, and easy to mold, they are most commonly used in the plastic container industry. However, it has been found that when a polyolefin bottle is used to package a beverage that contains essential oils and delicate flavor components such as a citrus juice, the juice acquires an off-flavor in a relatively short period of time. It is believed that this off-flavor is caused by the essential oils and flavoring components readily diffusing into and being absorbed by the polyolefin material. In addition, although polyolefins generally exhibit excellent moisture barrier properties, they are readily permeable to gases such as oxygen which will oxidize the various flavoring components and nutrients found in citrus juice and thereby significantly alter the juice's flavor composition and nutritional value.

In other areas of the packaging container art, there have been many attempts to improve container barrier characteristics, e.g., resistance to oxygen, moisture, and chemical permeation, by laminating a plurality of resins, each of which having different barrier properties. Particular success has been accomplished in producing high barrier containers that are made by using an injection-molded perform blow-molding process. In such a process, a laminate preform is first made by injecting a plurality of molten resin layers into an injection mold. The preform is removed from the injection mold after it has cooled and solidified. Thereafter, the preform is heated to a softened state and expanded with fluid pressure in a blow mold to form the multi-layered container. Examples of such injection-molded, laminated preforms and laminated containers made therefrom are shown in U.S. Pat. Nos. 3,955,697; 4,092,391; 4,109,813; and 4,501,781.

In addition to having good barrier properties, it is also important for a container to be of an economical size, which typically is one or two liters, or one-half or one gallon. Unfortunately, these large sized containers are bulky and difficult to handle, particularly for small children and senior adults. To provide a container with a size, shape, and handling characteristics that makes it easy to grasp and pour from, it has been found that consumers generally prefer containes that have a handle, preferably an integrally formed handle, that will permit one or more fingers to be inserted through an aperture between the handle and the container's sidewall. A well-known example of such a container is the one gallon, handled, polyethylene jug widely used to contain milk, an example of which is shown in U.S. Pat. No. 4,372,455. In order to make such a container, an extrusion blow-molding process must be used wherein a tube of thermoplastic material (a "parison") is extruded, followed by closing a blow mold around the parison such that a handle is pinched in the parison. Thereafter, the pinched parison is injected with a pressurized gas and expanded within the blow mold.

One type of plastic material that exhibits excellent flavor barrier properties is polyester, particularly polyethylene terephthalate (PET) and glycol-modified polyethylene terephthalate (PETG). Unfortunately, a container made of PET cannot be provided with an integrally-formed handle because PET cannot be extrusion blow-molded, a process which is required to make containers having an integrally molded handle as discussed above. This is because an extrusion blow-molding process can only be used when the polymer has sufficient viscosity, cohesion, and tensile strength in its molten state to support its own weight. Molten PET simply does not possess these properties.

Others have also recognized the desirability of using PET in multi-layered form, an example of which is U.S. Pat. No. 4,535,901, which issued to Okudaira et al. on Aug. 20, 1985. As disclosed therein, two or more kinds of thermoplastic resins, at least one of which being a polyester resin, is injection molded to form a multi-layered preform. The preform is then heated to an orientating temperature, followed by expanding the heated preform inside a blow mold cavity to produce a multi-layered container. As those skilled in the art will appreciate and as discussed above, it is not possible to make a container having an integral handle by using this type of process because the preform would have to be heated above its melt temperature in order to provide a good pinch-off weld or seal where the blow mold stamps a handle in the side of the preform.

In light of the above, a principal object of the present invention is to provide a multi-layered container that not only resists absorption of essential oils and flavoring components found in a delicate beverage such as a citrus juice contained therein, but also has an integrally-formed handle to make the container easy to grasp and pour from.

Another object of the present invention is to provide an extrusion blow-molded container having an integrally-formed handle with an innermost layer of PET as the container's product-contacting surface, said innermost PET layer significantly inhibiting the container's ability to absorb essential oils and flavoring components found in a delicate beverage contained therein.

A further object of the present invention is to provide an economical method of making a multi-layered container having an integrally-formed handle and a layer of PET as the container's innermost, product-contacting surface.

SUMMARY OF THE INVENTION

The present invention provides a multi-layered plastic bottle that not only protects the essential oils and flavoring components found in a delicate beverage such as citrus juice, but also has an integrally-formed handle to improve the container's carrying and pouring characteristics. In a particularly preferred method of making bottles of the present invention, a multi-layered parison comprised of an outer polyolefin layer, a middle adhesive or tie layer, and an innermost polyester layer is extruded from a co-extrusion nozzle. Once the parison is formed, a blow mold having handle forming means projecting form its inner surface is closed around the multi-layered parison such that the parison's top portion, bottom portion, and side wall are pinched to form the bottle's integrally-formed outlet finish, base, and handle, respectively. The pinched parison is then injected with expansion means such as a pressurized gas until it comes into contact with the mold's chilled inner surface, thereby forming the blow-molded bottle. After the bottle has cooled and solidified, the mold is opened and the bottle removed for further processing such as removing flash, sterilization, and filling.

In another particularly preferred embodiment of the present invention, the flash trimmed from the bottle is recycled and included in a four-layer parison comprising an outer polyolefin layer, a regrind layer, an adhesive layer, and an innermost polyester layer.

BRIEF DESCRIPTION OF THE DRAWINGS

While the specification concludes with claims particularly pointing out and distinctly claiming the subject matter regarded as forming the present invention, it is believed that the invention will be better understood from the following description with reference to the drawings in which:

FIG. 2 is a cross-sectionals schematic view of a particularly preferred extrusion apparatus that can be used for forming multi-layered parisons.

FIG. 3 is a plan schematic view of the apparatus illustrated in FIG. 2 taken along section line 3—3.

DETAILED DESCRIPTION OF THE INVENTION

In the following detailed description of the present invention, the same numeral is used to indicate common apparatus and workpiece components found in the various drawings. In addition, the terms "bottle" and "container" are used synonymously throughout. Finally, the frame, transport means, parison expansion means, timing circuitry, and the like which must necessarily be provided with respect to the functional members of the disclosed apparatus are not shown in the figures or described in detail in order to simplify and more clearly depict and disclose the present invention, it being believed that such details are well within the knowledge of those skilled in the art of extrusion blow-molding.

Figure 1:
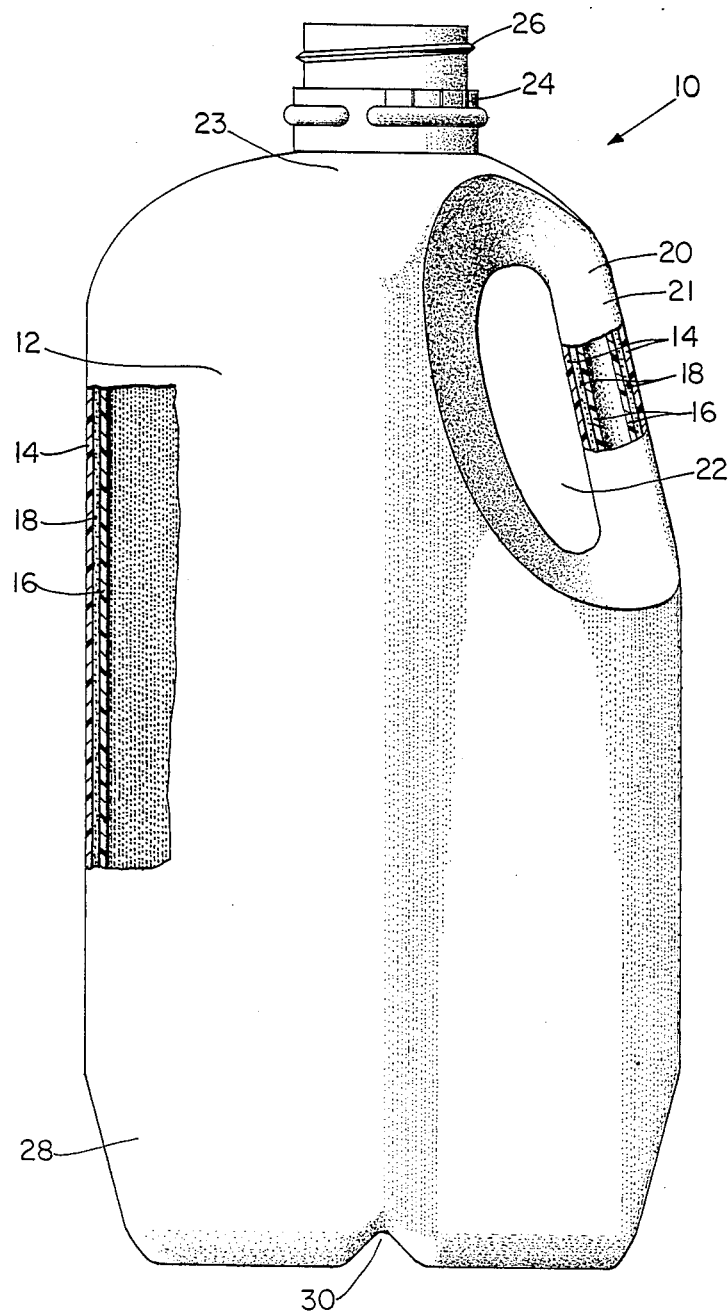
FIG. 1 is a front view of a multi-layered, handled plastic bottle of the present invention with a portion of the bottle's sidewall cut away to illustrate its multi-layered construction.

FIG. 1 is a front view of a particularly preferred plastic bottle generally indicated as 10 having a portion of its body section 12 cut away to more clearly illustrate its laminate construction. In this particularly preferred embodiment, bottle 10 includes an outer layer 14 comprised of a polyolefin material such as polyethylene or polypropylene, or a mixture thereof, and an innermost product-contacting layer 16 comprised of a polyester material such as polyethylene terephthalate (hereinafter referred to as "PET"). To improve adhesive between these two layers as well as to increase the drop strength of finished bottle 10 by promoting structurally sound pinch-off welds at the bottle's base and handle areas, an intermediate adhesive or tie layer 18 is also preferably included. Tie layer resins are generally polyolefin-based, interlaminar bonding agents that are used to adhere incompatible layers in laminated polymer structures. Choosing a tie resin for a particular application depends on various factors such as the chemical nature of the materials being bonded, their melt viscosities, processing temperatures, and the type of laminating process and equipment being used. Examples of tie resins include the CXA family available from duPont Chemical Company, which are essentially acid-anhydride modified ethylene vinyl acetate (EVA) multipolymers, and duPont Elvax®3165 ethylene vinyl acetate copolymer. Other examples include the Plexar family available from Northern Petrochemical Company, which include LDPE, MDPE, HDPE, PP, and EVA copolymers. Examples of particularly preferred materials suitable for tie layer 18 include duPont CXA 1123, which is an ethylene based polymer and vinyl acetate, or a blend of CXA 1123 and up to about 75% of Elvax 3165.

Still referring to FIG. 1, bottle 10 is provided with a handle 20 projecting outwardly from body section 12. The intermediate portion 21 of handle 20 and body section 12 are separated by gripping aperture 22 which provides a consumer a convenient means to grasp and tip bottle 10 to dispense the product therein. Handle 20 is integrally formed with body section 12 and is preferably a hollow conduit in fluid communication with the interior of bottle 10 to maximize volume utilization. The neck portion 23 of bottle 10 is provided with a dispensing outlet finish 24, the outer surface of which preferably having means 26 such as screw threads or snap-on lugs for releasably receiving a cap or closure (not shown). Base section 28 of bottle 10 preferably includes inverted V-shaped pinch weld 30 which improves the overall strength and integrity of bottle 10.

In order to integrally form handle 20 and body section 12, bottle 10 must be made by using an extrusion blow-molding process. In such a process, molten thermoplastic material is extruded through an extrusion nozzle to form a parison. A mold is closed around the parison such that it pinches or traps a portion of the parison's side to form the handle, and also pinch the parison's tail to form the bottle's bottom wall. The parison is then expanded by injecting pressurized air into the parison until it comes into contact with the mold's interior surface. After the formed bottle has cooled and solidified, the mold is opened and the finished bottle removed.

FIGS. 2 and 3 illustrate a preferred extrusion die generally indicated as 40 that is used in forming a multi-layered parison 42 from which bottle 10 illustrated in FIG. 1 is made. Extrusion die 40 includes die head 44, which is of side channel feed, concentric sleeve type construction, having attached thereto inner layer extruder 46, middle layer extruder 48, and outer layer extruder 50. Extruders 46, 48, and 50 include feed screws 52, 54 (FIG. 3), and 56, respectively, for advancing molten material under pressure into die head 44, each material being sufficiently heated in its respective extruder or while passing through die head 44 to provide the necessary degree of thermoplasticity to allow parison 42 to be formed. The thickness of each layer in parison 42 is controlled by varying the volumetric output of the respective extruder feeding the die.

Outer layer extruder 50 is in fluid communication with a source of a polyolefin, preferably polyethylene, polypropylene, or a mixture thereof, such as Norchem's 5602 high-density polyethylene (HDPE). To enhance the bottle's outer appearance, the polyolefin can include opacifying pigments such as carbon black, titanium dioxide (TiO$_2$), or a ferrous oxide. Middle layer extruder 48 is in fluid communication with a source of a tie or adhesive layer such as duPont CXA 1123, duPont Elvax ®3165, or a mixture thereof. Inner layer extruder 46 is in fluid communication with a source of a polyester material, preferably polyethylene terephthalate (PET), such as Eastopak ®9921 available from Tennessee Eastman Company. Preferably, the PET resin has been dried to a moisture level of about 0.001% before it enters inner layer extruder 46. If the PET resin is not dry, it will undergo a molecular weight breakdown when heated which will result in a significantly lower melt viscosity and an unacceptably high level of acetaldehyde.

Still referring to FIGS. 2 and 3, inner layer extruder 46 is in fluid communication with inner axial flow channel 58 and inner extruding orifice 64 of die head 44. Similarly, middle layer extruder 48 is in fluid communication with middle axial flow channel 60 and middle extruding orifice 66, and outer layer extruder 50 is in fluid communication with outer axial flow channel 62 and outer extruding orifice 68. Flow channels 58, 60, and 62 are concentrically arranged and preferably have a tear drop or heart-shaped geometry. Flow channels 58, 60, and 62 have their respective extruding orifices 64, 66 and 68 located in combining zone 69 adjacent to mandrel 70. Mandrel 70 can be moved up or down by turning parison programmer 72 to decrease or increase gap 74 between mandrel 70 and outer bushing 75 to increase or decrease the wall thickness of parison 42.

Mandrel 70 is provided with an air passageway 76 which is in fluid communication with a source of pressurized air (not shown) which when activated provides support air at approximately 20 psi to prevent parison 42 from collapsing. This pressurized air can also be used to pre-blow parison 42 to an intermediate size in a situation where the parison's diameter is not large enough to receive the handle forming means incorporated in the blow mold as will be hereinafter explained.

In forming multi-layered parison 42 by using extrusion die 40, it has been found that the best results are obtained if outer polyolefin layer 14 is heated to between 340°-450° F. (171°-232° C.), middle tie layer 18 is heated to between 340°-360° F. (171°-182° C.), and inner PET layer 16 is heated to between 530° F.-550° C. (277°-288° C.). Given these wide variations in processing temperatures and the inherent wide variations of each material's melt viscosities, it has been found that best results are obtained if the amount of time and distance that the various layers are in contact with each other is kept to a minimum. In addition, minimal contact time also significantly reduces the likelihood that the individual layers will mix with one another. Even better thermal stability can be achieved if the respective axial flow channels are thermally isolated from one another by using a thermally-isolated coextrusion die that uses the same basic principle as thermally-isolated blown film dies such as those available from the Sano Design & Machine Company of Passaic, New Jersey.

After parison 42 has been fully extruded, two halves of a blow mold are closed around the parison such that the mold grasps or pinches the parison in the neck, side (handle), and bottom area. Immediately thereafter, a knife 80, which is preferably heated and located directly below and off to the side of extrusion die 40, is moved laterally through parison 42 such that it severs parison 42 from extrusion die 40. Knife 80 can be moved laterally through parison 42 in this fashion by using for example pneumatic actuator 82.

Since parison 42 is preferably maintained in tubular form by introducing pressurized support air into the preform via mandrel air passageway 76 as explained earlier, or if parison 42 is to be pre-blown, the tail end of parison 42 is preferably pinched closed. Pinching the tail end of parison 42 is achieved by laterally moving cooperating pinchers 84 and 86 into contact with one another. Pincher 84 is preferably attached pneumatic actuator 82 while pincher 86 is attached to a second pneumatic actuator 88.

Figure 4:
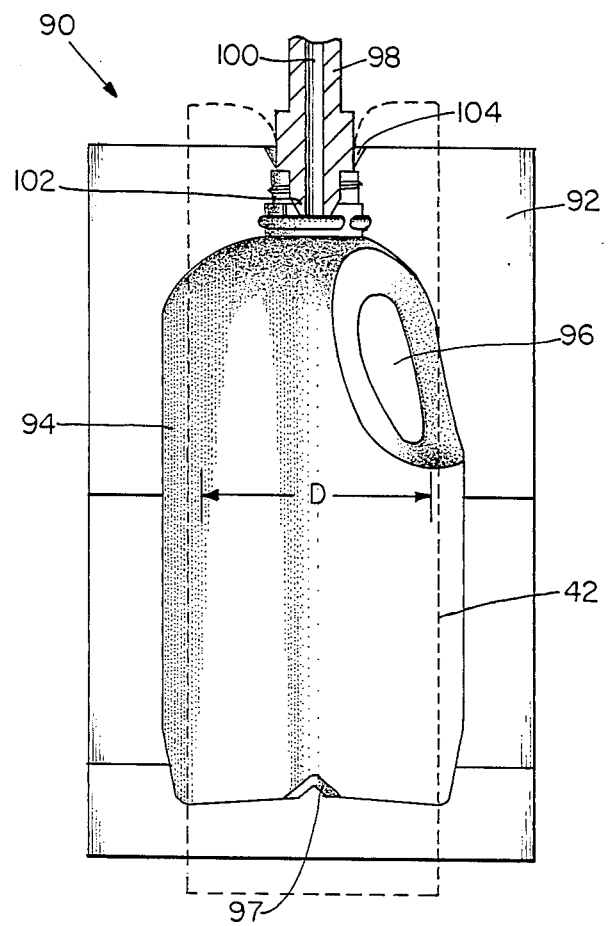
FIG. 4 is a cross-sectional schematic view of a blow mold used in making multi-layered, handled bottles of the present invention.

FIG. 4 is a side cross-sectional view of a blow mold generally indicated a 90 used in forming bottle 10 of the present invention. In FIG. 4, blow mold 90 is shown after it has been closed around parison 42 (dotted lines) and after the parison has been severed from die head 44. Blow mold 90 includes a rear half 92 and a front half (not shown), which is a mirror image of rear half 92. When rear half 92 and the front half of blow mold 90 are closed, they cooperatively define a hollow blow mold cavity 94 having the exact shape of the outer surface of finished bottle 10.

Rear mold half 92 and the front mold half both include cooperating handle forming means 96 projecting outwardly from their respective inner surfaces. Rear mold half 92 and the front mold half also include cooperating base weld forming means 97 projecting upwardly from the respective inner surfaces of their base portions. It has been found that the inverted V-shaped tapered projection illustrated in FIG. 4 produces a strong and reliable pinch-off weld. Further discussion on how to achieve structurally-sound pinch-off welds is found in U.S. Pat. No. 4,079,850 to Suzuk et al., which is incorporated herein by reference.

When blow mold 90 is closed around parison 42, handle forming means 96 of rear mold half 92 and the handle forming means of the front mold half cooperatively pinch a portion of parison 42 that ultimately corresponds to finger aperture 22 (FIG. 1) in finished bottle 10. Similary, base weld forming means 97 of rear mold half 92 and the base weld forming means of the front mold half cooperatively pinch the end portion of parison 42 that ultimately correspond to pinch weld 30 in base portion 28 of bottle 10. Of course, pinching parison 42 in this fashion will result in "flash" remaining between closed cooperating handle forming means 96 and between closed cooperating base weld forming means 97 that must be trimmed from the bottle after blow mold 90 is opened and the expanded bottle is removed.

As briefly mentioned earlier, parison 42 must be of a certain minimum width D as shown in FIG. 4 to accommodate handle forming means 96 of blow mold 90. If the width of parison 42 is less than minimum width D, parison 42 must be pre-blow with pressurized air through air passageway 76 in mandrel 80 to a width larger than width D before parison 42 is severed from extrusion die 40. For example, it has been found that parison 42 needs a minimum width D of approximately 3.5 inches (8.9 cm) for making ½ gallon (1.9 liter) handled bottles of the present invention.

Still referring to FIG. 4, the apparatus used to expand parison 42 into finished bottle 10 includes blow pin 98 having an air passageway 100 connected to a source of pressurized air (not shown). Blow pin 98 includes tapered tip 102 that enters both opening 104 at the top of closed mold 90 and the open top portion of hollow parison 42 when blow pin 98 is brought down into its blowing position as shown. After tip 102 is properly seated, a high-pressure gas is injected into parison 42 such that it expands until the parison's outer surface comes into contact with the inner surface of blow mold cavity 94. Alternatively, parison 42 can be expanded by creating a vacuum within blow mold cavity 94, which is another expanding technique used in the blow-molding industry.

After parison 42 has been fully expanded, the air pressure inside the expanded parison is maintained for a sufficient amount of time for the heated material to cool and solidify. Rear mold half 92 and the front mold half are then separated an the finished article removed for further processing such as removing flash, sterilizing, and filling.

As mentioned earlier herein, pinching the top portion, side portion, and base portion of parison 42 to form outlet finish 24, handle 20, and base pinch weld 30, respectively, of bottle 10 in the manner described above produces "flash" in these areas that must be trimmed away as scrap. Indeed, it has been found that depending on operating conditions, rates, and the overall geometry of finished bottle 10, as much as 50% of the total amount of material extruded becomes flash. Of course, in a manufacturing setting, this level of scrap could be prohibitively expensive. However, it has been surprisingly found that some of this flash can be reground, melted, and incorporated in bottles of the present invention as an intermediate regrind layer comprising a mixture of polyolefin, adhesive, and polyester by using a four-layer extrusion die. Parisons extruded from this four-layer die comprise an outer polyolefin layer, a regrind layer, an adhesive layer, and an innermost polyester layer.

In making such a four-layer parison, it has been found that best results are obtained if the recycle scrap rate is kept below 50% and the thicknesses of the extruded materials are maintained at about 10 mils (0.25 mm) polyolefin, 15 mils (0.38 mm) regrind, 1 mil (0.025 mm) adhesive, and 3 mils (0.075 mm) polyester. It has also been found that for scrap recycle rates of less than 50%, the adhesive and polyester thicknesses can be greater than those noted above; however, it has been found that in any event, the regrind layer preferably contains 6% or less and 26% or less by weight of adhesive and polyester, respectively.

EXAMPLE

The basic blow-molding apparatus used to make multi-layered handled plastic bottles of the present invention was a Kautex KEB 4/13-560/18 available from the Krupp-Kautex Company of Bonn, West Germany.

A S34/10 Satellite Extruder having a 1.34" (34 mm) screw diameter and also available from Kautex was used to process the bottle's innermost PET layer. The extruder had two main barrel heating zones and an additional heating zone in the throat area. The screw had an L/D ratio of approximately 24:1 and a compression ratio of 3:1. The screw had 14 feed flights, 7 compression flights, and 7 metering flights. The extruder was supplied with PET from a Whitlock SM5 50 material insulated drying hopper available from the Whitlock Engineering Company of Farminton Hills, Michigan. A Pall AMLOC-DHA Air Dryer model number T125DHA4-4 was used to supply the hopper with dry, heated air at 350° F. (177° C.) to keep the PET's moisture content below acceptable levels. The PET was heated to about 530° F. (277° C.) and extruded at a rate of about 6.0 lbs (2.7 kg)/hour.

A 1 ¾-ZOD-4 ½ S Egan Reciproscrew extruder having a 1¾" (44.5 mm) screw diameter and 20:1 L/D ratio available from the Frank W. Egan Company of Somerville, New Jersey was used to process the bottle's outermost polyolefin layer. The extruder had three main barrel heating zones that were controlled by a West Octet microprocessor controller. The reciprocating screw was locked in place while extruding multi-layered parisons of the present invention. Norchem 5602 HDPE was heated to about 340° F. (171° C.) and extruded at a rate of about 27.0 lbs (12.3 kg)/hour.

A ¾" Wayne extruder having a ¾"(19mm) screw diameter and a 24:1 L/D ratio available from the Wayne Machinery Company was used to process the bottle's middle tie layer. The extruder was equipped with a general purpose screw and had three main barrel heating zones. DuPont CXA 1123 was heated to about 350° F. (177° C.) and extruded at a rate of about 2.0 lbs. (0.91 kg)/hour.

A three-layered parison about 3.0 inches (7.6 cm) wide and 13.5 inches (34.3 cm) long was extruded from the extrusion die and pre-blown with 20 psi air to a width of about 3.5 inches (8.9 cm) before it was severed from the die and placed within the mold. The parison was then injected with air at a pressure of approximately 40 psi and expanded until it came into contact with the mold's inner surface, which was maintained at temperature of approximately 45° F. (7° C.). After the injected air was held for about 20 seconds, the blow mold was opened and the three-layered, handled bottle was removed.

The finished bottle had an internal volume of 64 ounces (1.9 liter) and a wall thickness of about 0.035 inches (0.9 mm). The thickness of the outer HDPE layer ranged from about 0.027 inches to about 0.031 inches (0.69–0.70 mm). The thickness of the inner PET layer ranged from about 0.002 to about 0.007 inches (0.5–0.18 mm). The intermediate tie layer was about 0.001 inches (0.025 mm) thick or less throughout.

To illustrate the superior ability of a polyester-lined bottle to preserve essential oils and nutritional components, an "aging study" was conducted on orange juice that had been stored in various 64 ounce (1.9 liter) bottles and containers. The filled bottles and containers were stored at 40° F. (4.4° C.) for an eight week period after which time the juice was analyzed to determine the percentage loss of peel oil, d-limonene, and l-ascorbic acid (Vitamin C). The results are listed in TABLE 1 below.

TABLE 1

|  | % Loss | | |
| --- | --- | --- | --- |
|  | d-limonene | peel oil | l-ascorbic acid |
| Carton A | 45 | 34 | 50 |
| Bottle B | 56 | 41 | 51 |
| Bottle C | 7 | 0 | 38 |
| Bottle D | 0 | 0 | 19 |

Carton A - standard polyethylene/paperboard/aluminum foil/polyethylene carton
Bottle B - standard blow-molded polyethylene bottle
Bottle C - bottles made according to the present invention
Bottle D - standard glass bottle.

The foregoing table illustrates that Bottle C of the present invention exhibited a substantial improvement in essential oil and nutritional component retention over commonly-used prior art structures. Indeed, Bottle C's performance approached the ability of glass (control) in preserving peel oil, d-limonene, and l-ascorbic acid.

While several particularly preferred embodiments of the present invention have been described and illustrated, it will now be obvious to those skilled in the art that various changes and modifications can be made thereto without departing from the spirit and scope of the invention. Accordingly, the following claims are intended to embrace such changes and modifications.

What is claimed is:

1. A multi-layered handled plastic bottle for containing a citrus beverage having essential oils and delicate flavoring components, said bottle providing enhanced retention of said essential oils and flavoring components found in said citrus beverage contained therein, said bottle comprising:
   (a) a base section, a body section, a neck section and an upwardly-extending dispensing outlet finish having a dispensing aperture and an outer surface;
   (b) a handle projecting outwardly from said body section, said handle having opposed ends, the portion of said handle intermediate said ends being spaced by a gripping aperture from said body section;
   (c) said base section, said body section, said neck section, said upwardly-extending dispensing outlet finish, and said handle being multi-layered with an outer polyolefin layer, an intermediate adhesive layer, and an inner polyester layer and being integrally formed by expanding an extruded tubular multi-layered parison; and
   (d) wherein said parison comprises an outer polyolefin layer, an intermediate adhesive layer, and an inner polyester layer that contacts said citrus beverage.

2. The multi-layered handled plastic bottle recited in claim 1 wherein said bottle further comprises a regrind layer.

3. The multi-layered handled plastic bottle recited in claim 1 wherein said handle is a hollow conduit and wherein said opposed ends are in fluid communication with said body section.

4. The multi-layered handled plastic bottle recited in claim 1 further comprising:
   (e) means for closing said dispensing aperture; and
   (f) means for releasably securing said closing means to said bottle, said securing means projecting outwardly from said outer surface of said dispensing outlet finish.

5. The multi-layered handled plastic bottle recited in claim 4 wherein said closing means comprises a cap and said securing means comprises screw threads.

6. The multi-layered handled plastic bottle recited in claim 1 herein said base section includes an inverted V-shaped pinch-off weld.

7. The multi-layered handled plastic bottle recited in claim 1 wherein said polyolefin layer is selected from the group consisting of polyethylene, polypropylene, and mixtures thereof.

8. The multi-layered handled plastic bottle recited in claim 1 wherein said liquid-contacting polyester layer is selected from the group consisting of polyethylene terephthalate and glycol-modified polyethylene terephthalate.

* * * * *

UNITED STATES PATENT AND TRADEMARK OFFICE
CERTIFICATE OF CORRECTION

PATENT NO. : 4,846,359

DATED : July 11, 1989

INVENTOR(S) : James C. Baird, Cornelis H. Japikse, Steven F. Quigley
              Edward J. Simpson It is certified that error appears in the above-identified patent and that said Letters Patent is hereby corrected as shown below:

Column 1, line 43 "perform" should read -- preform -- .

Column 1, line 62 "containes" should read -- containers -- .

Column 3, line 2 "form" should read -- from -- .

Column 3, line 30 "cross-sectionals" should read -- cross-sectional -- .

Column 3, line 63 "adhesive" should read -- adhesion -- .

Column 5, line 47 "550°C" should read -- 550°F -- .

Column 6, line 15 "a" should read -- as -- .

Column 6, line 56 "pre-blow" should read -- pre-blown -- .

Column 6, line 57 "80" should read -- 70 -- .

Column 7, line 14 "an" should read -- and -- .

Column 7, line 64 "Farminton" should read -- Farmington -- .

Column 8, line 29 after "at" insert -- a -- .

Column 8, line 38 "0.70 mm" should read -- 0.79 mm -- .

Column 8, line 52 delete "TABLE I" first occurrence.

Column 10, line 23 "herein" should read -- wherein -- .

Signed and Sealed this

Twenty-fourth Day of April, 1990

*Attest:*

HARRY F. MANBECK, JR.

*Attesting Officer*  *Commissioner of Patents and Trademarks*